(12) United States Patent
Chang et al.

(10) Patent No.: US 12,437,125 B2
(45) Date of Patent: Oct. 7, 2025

(54) COMPUTER AIDED DESIGN SYSTEM AND METHOD FOR EDUCATIONAL TABLE GAMES

(71) Applicant: National Taiwan Normal University, Taipei (TW)

(72) Inventors: Chun-Yen Chang, Taipei (TW); Ping-Han Cheng, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 953 days.

(21) Appl. No.: 17/565,941

(22) Filed: Dec. 30, 2021

(65) Prior Publication Data

US 2022/0207200 A1    Jun. 30, 2022

(30) Foreign Application Priority Data

Dec. 31, 2020    (TW) .................................. 109147007

(51) Int. Cl.
*G06F 7/48*    (2006.01)
*G06F 30/12*    (2020.01)

(52) U.S. Cl.
CPC .................................. *G06F 30/12* (2020.01)

(58) Field of Classification Search
CPC ....................................................... G06F 30/12
See application file for complete search history.

(56) References Cited

U.S. PATENT DOCUMENTS

2014/0162775 A1* 6/2014 Hawver .................. A63F 13/95
463/31
2020/0298102 A1* 9/2020 Varrasso ............... A63F 13/792

OTHER PUBLICATIONS

Zarraonandia, Telmo, et al. "Designing educational games through a conceptual model based on rules and scenarios." Multimedia Tools and Applications 74 (2015): 4535-4559. (Year: 2015).*

* cited by examiner

*Primary Examiner* — Nithya J. Moll
(74) *Attorney, Agent, or Firm* — MUNCY, GEISSLER, OLDS & LOWE, P.C.

(57) ABSTRACT

The invention discloses a computer aided design system and method for an educational table game. A plurality of predetermined objects, a plurality of predetermined hierarchical subjects, a plurality of predetermined learning contents, a plurality of predetermined game rule templates, a plurality of predetermined game scene templates, and a plurality of predetermined game accessory templates are previously provided. For the educational table games, a selected object is selected from the predetermined objects is selected, and a selected hierarchical subject is selected from the predetermined hierarchical subjects. Then, at least one selected learning content is selected. Next, a set game rule is set. Afterward, a set game scene is set. Then, a set game accessory package file is set. Finally, a game plan file is generated, and the game plan file and the set game accessory package file are output.

5 Claims, 22 Drawing Sheets

Game system output – game scene

B2-1. Game scene – time and space background

| | Time backgroung | Exact time |
|---|---|---|
| V | Modern : 15 -22 century | 2030 year |

| | Space background | Exact space |
|---|---|---|
| V | Field : the whole picture cannot be seen with the naked eyes, which is larger than the human body | race track |

| | Play role | Exact role |
|---|---|---|
| V | Human : Players play humans | auto engineer |

Number of players  2 - 4 persons

B2-2. Game scene – goal and story

| Victory goal-end condition | Victory goal-victory decision |
|---|---|
| ☑ Number completed | ☑ Goal first |
| ☑ Designated distance | ☑ To the finish line |

Game goal

When someone brings the four cars to the finish line, the game ends; the person who finishes first wins.

Game background and story

This is the annual marathon! But it is a vehicle that runs, not a person. Players will play the role of engineers of a competition team, and need to preset and allocate the power and time of the four automatic cars to ensure that the four cars can reach the end earlier than other teams!

C2. Game accessories selection

Game system output - game accessory  13

| Game process | Event title | 2D accessosry | 3D accessory |
|---|---|---|---|
| select | transportion | vehicle card | |
| play a card | applying force | force card | |
| play a card | moving time | time card | |
| settle | moving vehicle | vehicle card / map board | vehicle model |
| draw a card | drawing a card | | vehicle model |

106c

※ Learning load analysis | Game content load  -4
109

Next   File output

FIG. 16

A2. Plan output

| Game name | Automatic car marathon | | |
|---|---|---|---|
| Game time | 45 minutes | Game object | junior high school second grade |
| Number of players | 2-4 persons | Game subject | Natural sciences |
| Subject content | This game is based on the natural science of the curriculum guideline, with the fourth stage (junior high school) of matter system-force and motion as the game scene. The content includes:<br>★ With the same force acting for the same time, the smaller the mass, the greater the speed change caused by the force.<br>1. Force can cause an article to move or rotate. | | |
| Game accessories | vehicle model, force card, time card, map board | | |
| Game background | This is the annual marathon! But it is a vehicle that runs, not a person. Players will play the role of engineers of a competition team, and need to preset and allocate the power and time of the four automatic cars to ensure that the four cars can reach the end earlier than other teams! | | |
| | Time background | Space background | Role background |
| | Modern | Field | Human |
| | 2030 year | race track | Automated vehicle engineer |

FIG. 18

COMPUTER AIDED DESIGN SYSTEM AND METHOD FOR EDUCATIONAL TABLE GAMES

CROSS-REFERENCE TO RELATED APPLICATION

This utility application claims priority to Taiwan Application Serial Number 109147007, filed Dec. 31, 2020, which is incorporated herein by reference.

BACKGROUND OF THE INVENTION

1. Field of the Invention

The invention relates to a computer aided design system and a computer aided design method for an educational table game.

2. Description of the Prior Art

In recent years, as the public's effort to invest in table games has increased, the effects of table games in teaching have gradually been revealed. Therefore, teachers' ideas for using table games in teaching have gradually risen, and their demand has also increased. As a result, the teacher community began to try to use current table games in the school curriculum, and even to try to design and promote these table games.

However, in order to meet the needs of education, the content of the development of table games is still insufficient. Current educational table games tend to be biased towards the transfer of knowledge rather than the cultivation of practical nature and issue handling. Although educators and learners are committed to using table games for learning, they still cannot meet the needs of multiple literacy and issue literacy, and can only be limited to the use of what they have learned in these table games.

Although the analysis and design of educational table games based on the purpose of literacy cultivation should be the basis of design of these educational table games, the application of literacy in life involves the whole system of operations of nature and society. The abstract context regarding literacy makes it difficult for designers to clarify and analyze the key factors and linkages. Furthermore, the design of educational table games includes the designer's cognitions for the topic content and the game operation, as well as the designer's cognition for the difficulty and load of the topic content and the game operation for the participants. The designer's cognitions mentioned above are more complex and composite thinking and analysis. As a result, after spending a lot of time, a designer full of energy is likely to lose a lot of costs due to limited effects of the educational table game product or abandonment in the middle.

Furthermore, in addition to the difficulty in the construction of the issue system and the design of the game system, when the art and accessories (cards, drawing boards, etc.) on the back end of the table game are created, consideration for the configuration of text, drawing and icons and time consuming for the creation of a large number of accessory files, or poor configuration leads to lack of interest in participants, which all make designers often encounter setbacks.

In addition, aided design by computer is widely used in many industrial fields, such as architecture filed, electronic field, mechanism field, etc. However, there has been no development of computer aided design systems in the education field and the table game design field.

SUMMARY OF THE INVENTION

Accordingly, one scope of the invention is to provide a computer aided design system and a computer aided design method for an educational table game. The computer aided design system and method according to the invention can greatly reduce the designers' workload and cost for the design of the educational table game, and allow educational table game designers to clearly understand the system of literacy and life issues and the technologies and analytical techniques when designing the educational table game. The computer aided design system and method according to the invention can allow educational table game designers to design educational table games based on literacy cultivation more efficiently.

A computer aided design system according to the first preferred embodiment of the invention is for an educational table game, and includes a data storage device, a table game data processing device, a table game file outputting device, and a graphical user interface. The data storage device therein stores a plurality of predetermined objects, a plurality of predetermined hierarchical subjects, a plurality of predetermined learning contents, a plurality of predetermined game rule templates, a plurality of predetermined game scene templates, and a plurality of predetermined game accessory templates. The table game data processing device is coupled to the data storage device. The table game file outputting device is coupled to the data storage device and the table game data processing device respectively. The graphical user interface is coupled to the table game data processing device. The graphical user interface is configured to provide the predetermined objects and the predetermined hierarchical subjects, retrieved by the table game data processing device, for selection. The graphical user interface is configured to receive a selected object selected from the predetermined objects and a selected hierarchical subject selected from the predetermined hierarchical subjects for the educational table game. The table game data processing device retrieves a plurality of retrieved learning contents from the predetermined learning contents in accordance with the selected hierarchical subject, and provides the retrieved learning contents for selection through the graphical user interface. The graphical user interface receives at least one selected learning content selected from the retrieved learning contents. The table game data processing device retrieves a plurality of retrieved game rule templates from the predetermined game rule templates in accordance with the at least one selected learning content, and provides the retrieved game rule templates for selection through the graphical user interface. The graphical user interface receives at least one selected game rule template selected from the retrieved game rule templates. The graphical user interface receives a plurality of first setting conditions for the at least one selected game rule template into a set game rule. The table game data processing device retrieves a selected game scene template from the plurality of predetermined game scene templates in accordance with the set game rule, and provides the selected game scene template for setting through the graphical user interface. The graphical user interface receives a plurality of second setting conditions for the selected game scene template into a set game scene. The table game data processing device retrieves a plurality of retrieved game accessory templates from the predetermined game accessory templates in accordance with the set game scene, and provides the retrieved game accessory templates for selection through the graphical user interface. The graphical user interface receives a selected game accessory template selected from the retrieved game accessory templates. The graphical user interface receives a plurality of third setting conditions for the selected game accessory template into a set game accessory package file. The table game data processing device generates a game plan file in accordance with the set game scene, and outputs the game plan file and the set game accessory package file through the table game file outputting device.

Further, the computer aided design system according to the first preferred embodiment of the invention also includes a learning content priority analyzing device and a learning load analyzing device. The learning content priority analyzing device is coupled to the table game data processing device. The learning content priority analyzing device functions in generating a recommended learning content priority list in accordance with the at least one selected learning content and providing the recommended learning content priority list for setting through the graphical user interface. The graphical user interface receives a plurality of fourth setting conditions for the recommended learning content priority list into a set learning content priority list. The learning load analyzing device is coupled to the table game data processing device and the learning content priority analyzing device respectively. The learning load analyzing device functions in generating a learning content load value in accordance with the selected object and the set learning content priority list.

In one embodiment, the learning load analyzing device also functions in generating a game content load value in accordance with the set game rule.

Further, the computer aided design system according to the first preferred embodiment of the invention also includes a learning effectiveness evaluating device. The learning effectiveness evaluating device is coupled to the table game data processing device, the learning content priority analyzing device and the learning load analyzing device respectively. The learning effectiveness evaluating device functions in generating a learning effectiveness evaluation value in accordance with the learning content load value and the game content load value.

In one embodiment, the set game accessory package file includes a plurality of two-dimensional accessory files and/or a plurality of three-dimensional accessory files.

A computer aided design method according to the second preferred embodiment of the invention is for an educational table game, and previously provides a plurality of predetermined objects, a plurality of predetermined hierarchical subjects, a plurality of predetermined learning contents, a plurality of predetermined game rule templates, a plurality of predetermined game scene templates, and a plurality of predetermined game accessory templates. Firstly, the computer aided design method according to the invention is to provide the predetermined objects and the predetermined hierarchical subjects for selection. Then, the computer aided design method according to the invention is for the educational table game to receive a selected object selected from the predetermined objects and a selected hierarchical subject selected from the predetermined hierarchical subjects. Next, the computer aided design method according to the invention is to retrieve a plurality of retrieved learning contents for selection from the predetermined learning contents in accordance with the selected hierarchical subject. Afterward, the computer aided design method according to the invention is to select at least one selected learning content from the retrieved learning contents. Subsequently, the computer aided design method according to the invention is to retrieve a plurality of retrieved game rule templates for selection from the predetermined game rule templates in accordance with the at least one selected learning content. Then, the computer aided design method according to the invention is to select at least one selected game rule template from the retrieved game rule templates. Next, the computer aided design method according to the invention is for the at least one selected game rule template to set a plurality of first setting conditions into a set game rule. Afterward, the computer aided design method according to the invention is to retrieve a selected game scene template for selection from the plurality of predetermined game scene templates in accordance with the set game rule. Subsequently, the computer aided design method according to the invention is for the selected game scene template to set a plurality of second setting conditions into a set game scene. Then, the computer aided design method according to the invention is to retrieve a plurality of retrieved game accessory templates for selection from the predetermined game accessory templates in accordance with the set game scene. Next, the computer aided design method according to the invention is to select a selected game accessory template selected from the retrieved game accessory templates. Afterward, the computer aided design method according to the invention is for the selected game accessory template to set a plurality of third setting conditions into a set game accessory package file. Subsequently, the computer aided design method according to the invention is to generate a game plan file in accordance with the set game scene. Finally, the computer aided design method according to the invention is to output the game plan file and the set game accessory package file.

Different from the prior arts, the computer aided design system and method according to the invention can greatly reduce the designers' workload and cost for the design of the educational table game, and allow educational table game designers to clearly understand the system of literacy and life issues and the technologies and analytical techniques when designing the educational table game. The computer aided design system and method according to the invention can allow educational table game designers to design educational table games based on literacy cultivation more efficiently.

The advantage and spirit of the invention may be understood by the following recitations together with the appended drawings.

BRIEF DESCRIPTION OF THE APPENDED DRAWINGS

FIGS. 3 to 20 are schematic diagrams of the user interface screens of the computer aided design system according to the first preferred embodiment of the invention in individual stages of an example execution.

DETAILED DESCRIPTION OF THE INVENTION

Figure 1:
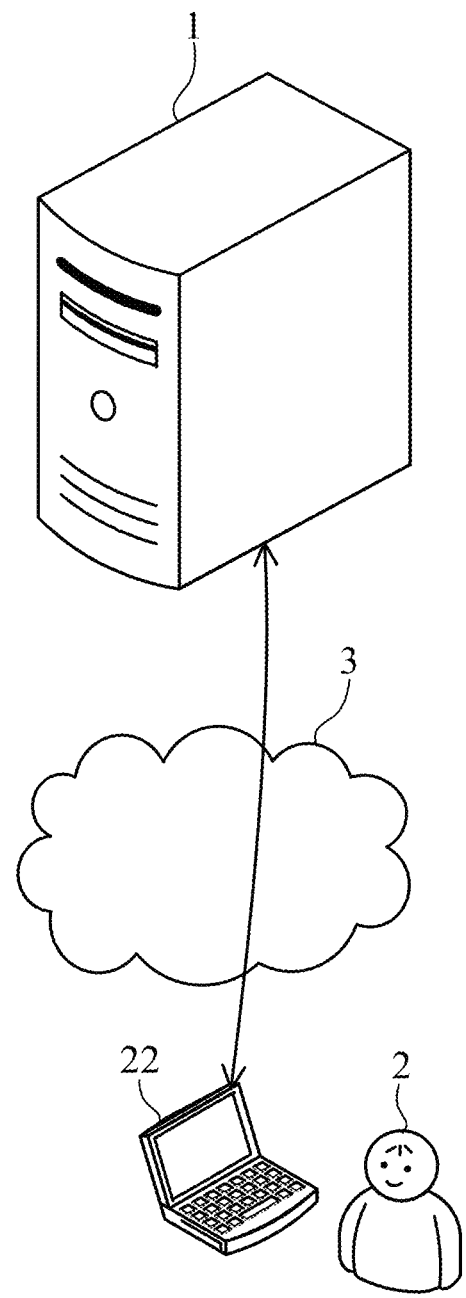
FIG. 1 is a schematic diagram of a computer aided design system, according to the first preferred embodiment of the invention, for an educational table game and the implementation architecture thereof.
Figure 2:
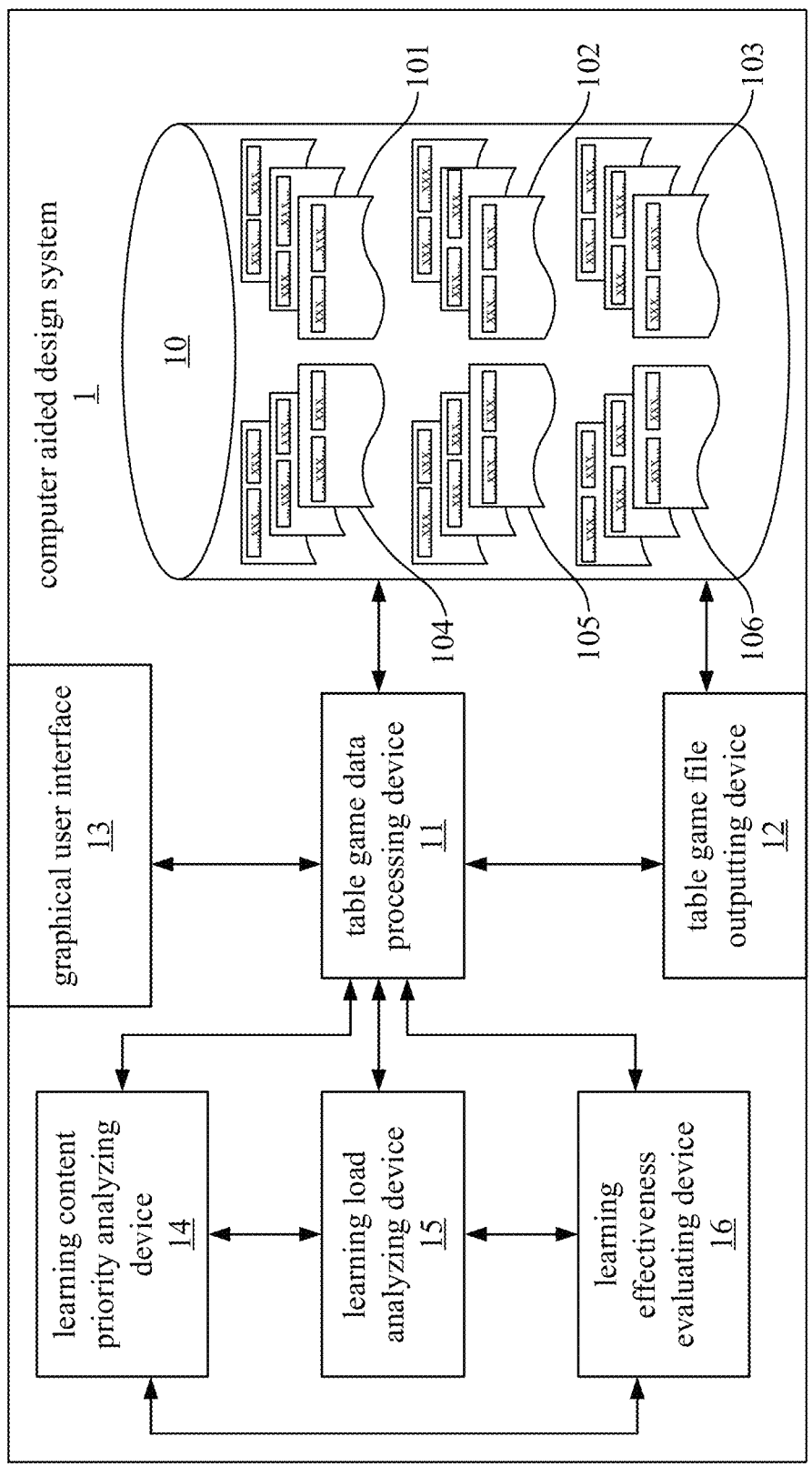
FIG. 2 is a functional block diagram of the computer aided design system according to the first preferred embodiment of the present invention.

Referring to FIG. 1, FIG. 2 and FIGS. 3 to 20, these drawings schematically illustrates a computer aided design system 1, according to the first preferred embodiment of the invention, for an educational table game. FIG. 1 is a schematic diagram of the computer aided design system 1 according to the first preferred embodiment of the invention and the implementation architecture thereof. FIG. 2 is a functional block diagram of the computer aided design system 1 according to the first preferred embodiment of the present invention. FIGS. 3 to 20 are schematic diagrams of the user interface screens of the computer aided design system 1 according to the first preferred embodiment of the invention in individual stages of an example execution.

As shown in FIG. 1, a user 2 can operate a data processing apparatus 22 to link to the computer aided design system 1 according to the first preferred embodiment of the invention through a network 3, and then use the computer aided design system 1 according to the first preferred embodiment of the invention to design the conceived educational table game.

As shown in FIG. 2, the computer aided design system 1 according to the first preferred embodiment of the invention includes a data storage device 10, a table game data processing device 11, a table game file outputting device 12, and a graphical user interface 13.

The data storage device 10 therein stores a plurality of predetermined objects 101, a plurality of predetermined hierarchical subjects 102, a plurality of predetermined learning contents 103, a plurality of predetermined game rule templates 104, a plurality of predetermined game scene templates 105, and a plurality of predetermined game accessory templates 106. The table game data processing device 11 is coupled to the data storage device 10. The table game file outputting device 12 is coupled to the data storage device 10 and the table game data processing device 11 respectively.

Figure 3:
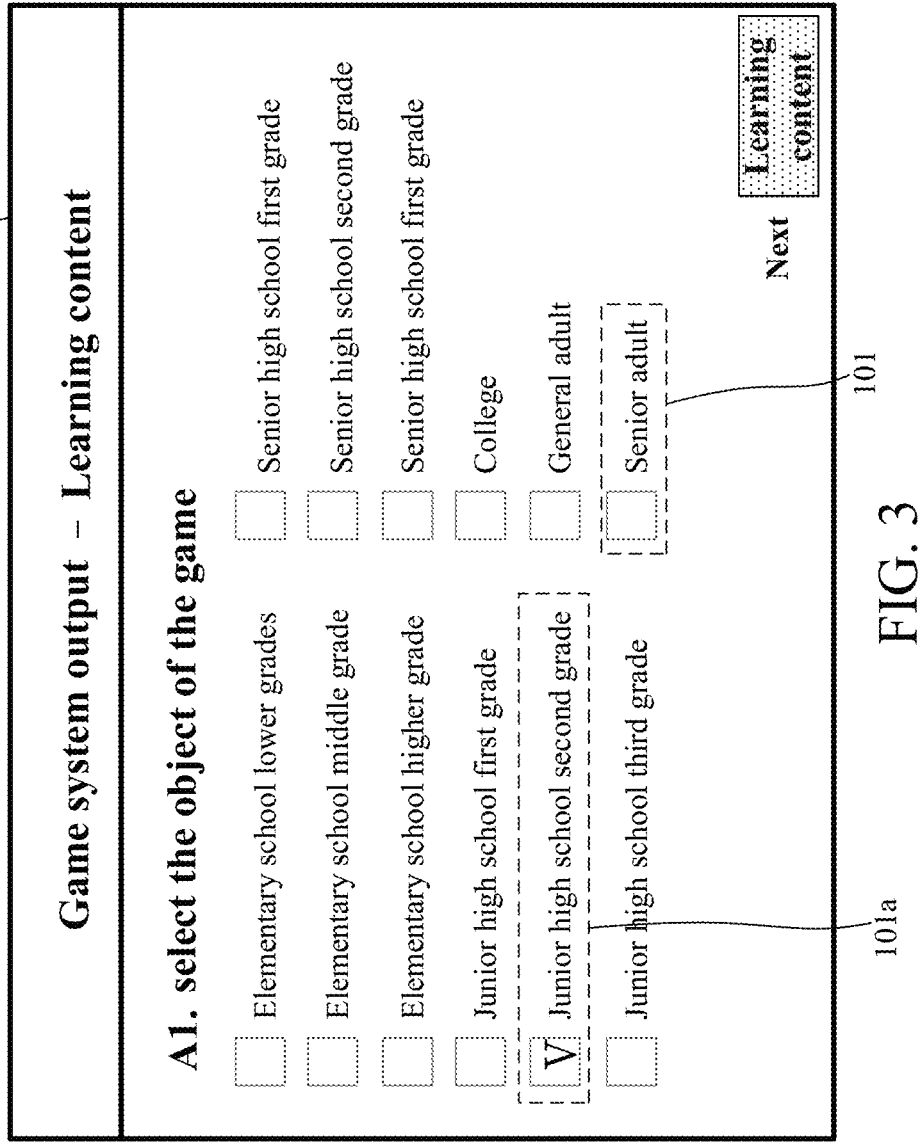

The graphical user interface 13 is coupled to the table game data processing device 11. The graphical user interface 13 is configured to provide the predetermined objects 101, retrieved by the table game data processing device 11, for the user 2 to be selected. As shown in FIG. 3, FIG. 3 is a screen diagram in which the graphical user interface 13 provides the plurality of predetermined objects 101 for selection in an example of the invention.

The graphical user interface 13 is configured to receive a selected object 101a selected from the predetermined objects 101 for the educational table game. Also as shown in FIG. 3, in the example of the invention, the screen diagram also shows that the selected object 101a is selected through the graphical user interface 13 operated by the user 2.

Figure 4:
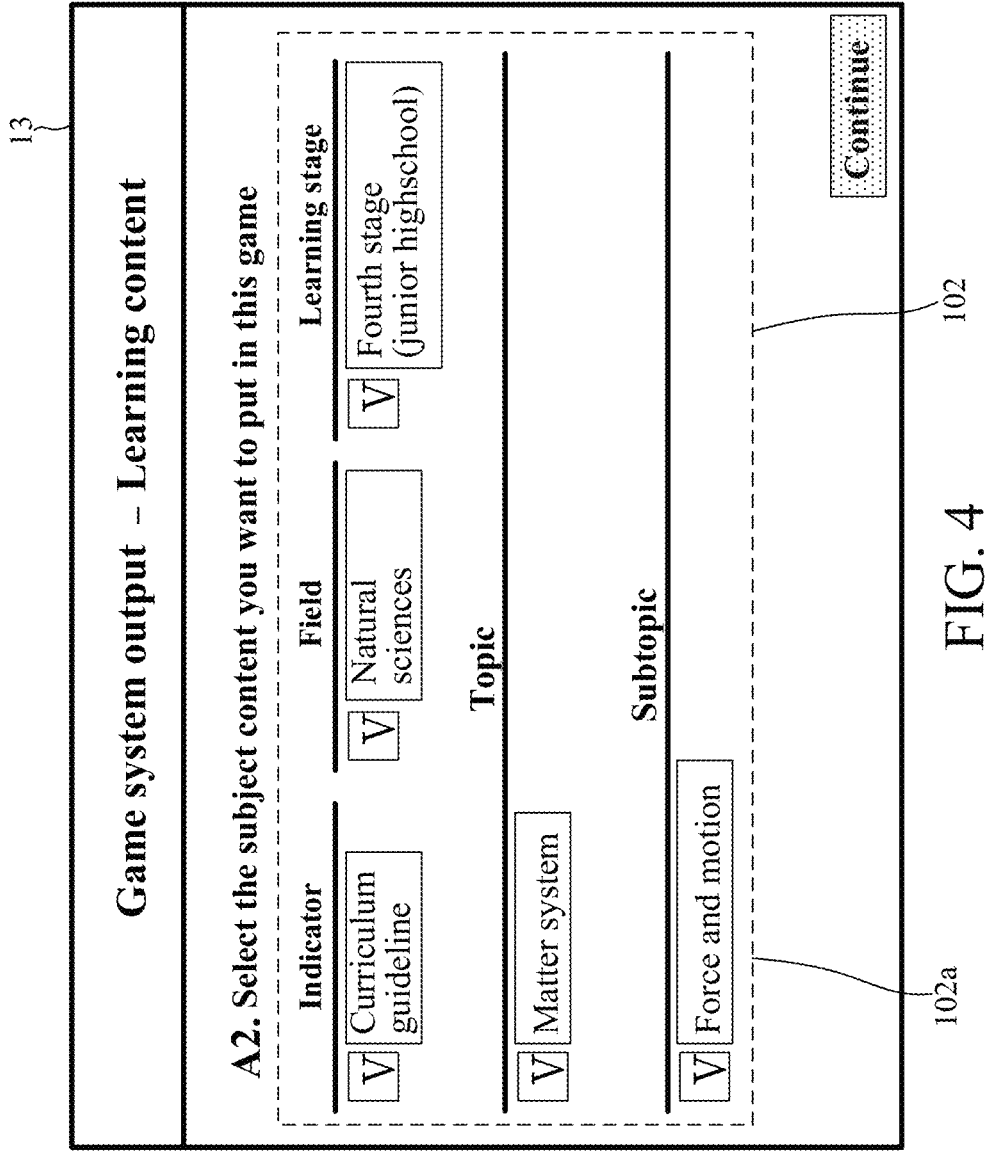

The graphical user interface 13 is configured to provide the predetermined hierarchical subjects 102, retrieved by the table game data processing device 11, for the user 2 to be selected. As shown in FIG. 4, FIG. 4 is a screen diagram in which the graphical user interface 13 provides the plurality of predetermined hierarchical subjects 102 for selection in an example of the invention. In the example shown in FIG. 4, the hierarchical subject 102 is hierarchically planned according to indicators, fields, learning stages, topics, and subtopics, but the invention is not limited to this hierarchical plan.

The graphical user interface 13 is configured to receive a selected hierarchical subject 102a selected from the predetermined hierarchical subjects 102 for the educational table game. Also as shown in FIG. 4, in the example of the invention, the screen diagram also shows that the selected hierarchical theme 102a is selected through the graphical user interface 13 operated by the user 2.

Figure 5:
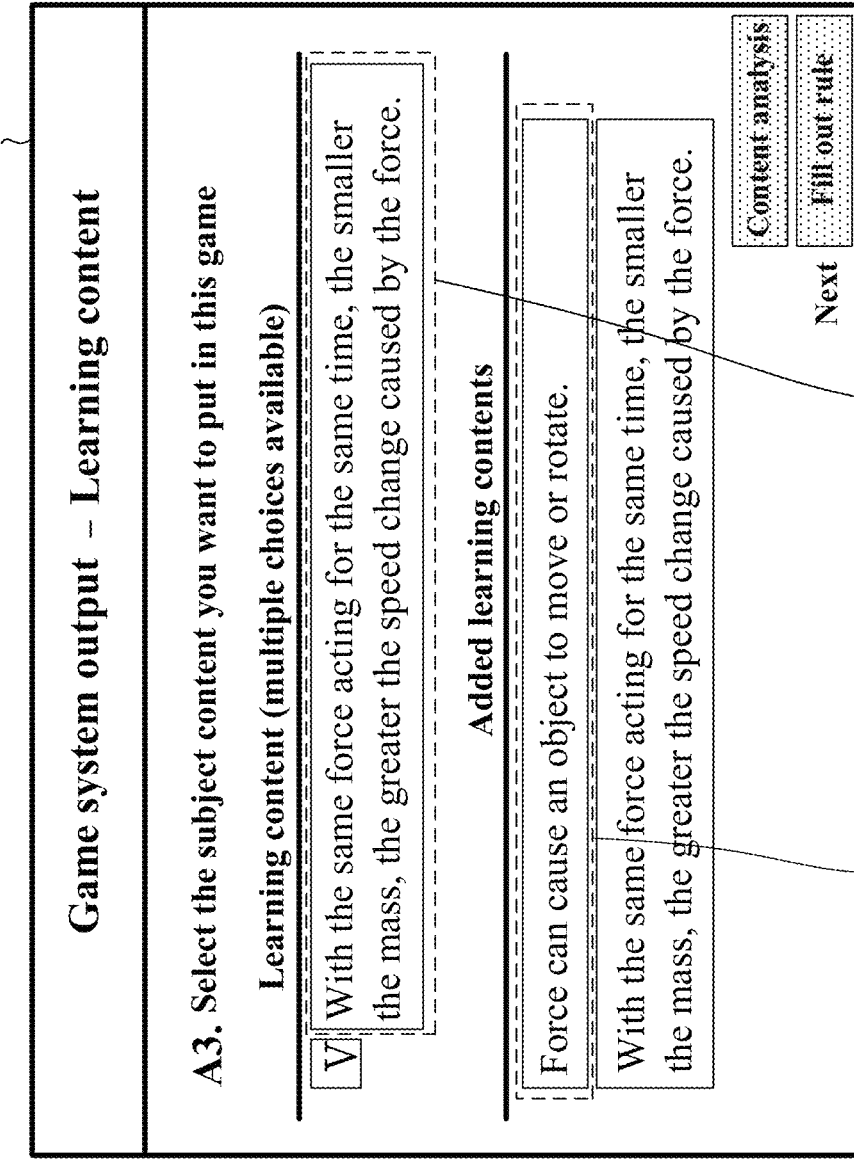

The table game data processing device 11 retrieves a plurality of retrieved learning contents 103a from the predetermined learning contents 103 in accordance with the selected hierarchical subject 102a, and provides the retrieved learning contents 103a for the user 2 to be selected through the graphical user interface 13. As shown in FIG. 5, FIG. 5 is a screen diagram in which the graphical user interface 13 provides the plurality of predetermined learning contents 103 for selection in an example of the invention. In the example shown in FIGS. 3, 4, and 5, the educational table game that user 2 wants to design is designed for second-year students in junior high school to learn Newton's second law of motion.

The graphical user interface 13 receives at least one selected learning content 103b selected from the retrieved learning contents 103a. Also as shown in FIG. 5, in the example of the invention, the screen diagram also shows that the at least one selected learning content 103b is selected through the graphical user interface 13 operated by the user 2.

Figure 6:
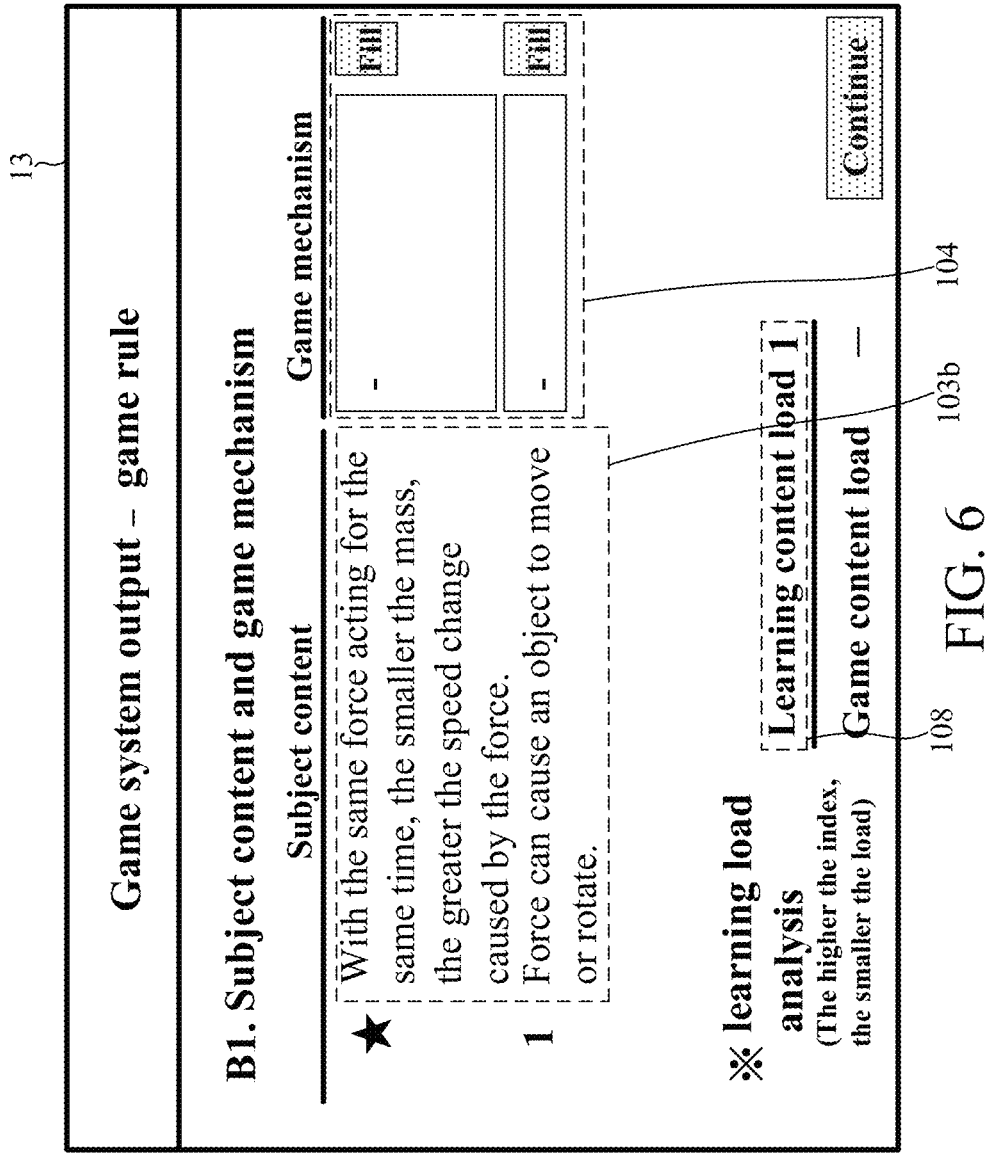

The table game data processing device 11 retrieves a plurality of retrieved game rule templates 104 from the predetermined game rule templates 104 in accordance with the at least one selected learning content 103b, and provides the retrieved game rule templates 104 for the user 2 to be selected through the graphical user interface 13. As shown in FIG. 6, FIG. 6 is a screen diagram in which the graphical user interface 13 provides the plurality of game rule templates 104 for selection in an example of the invention.

Figure 7:
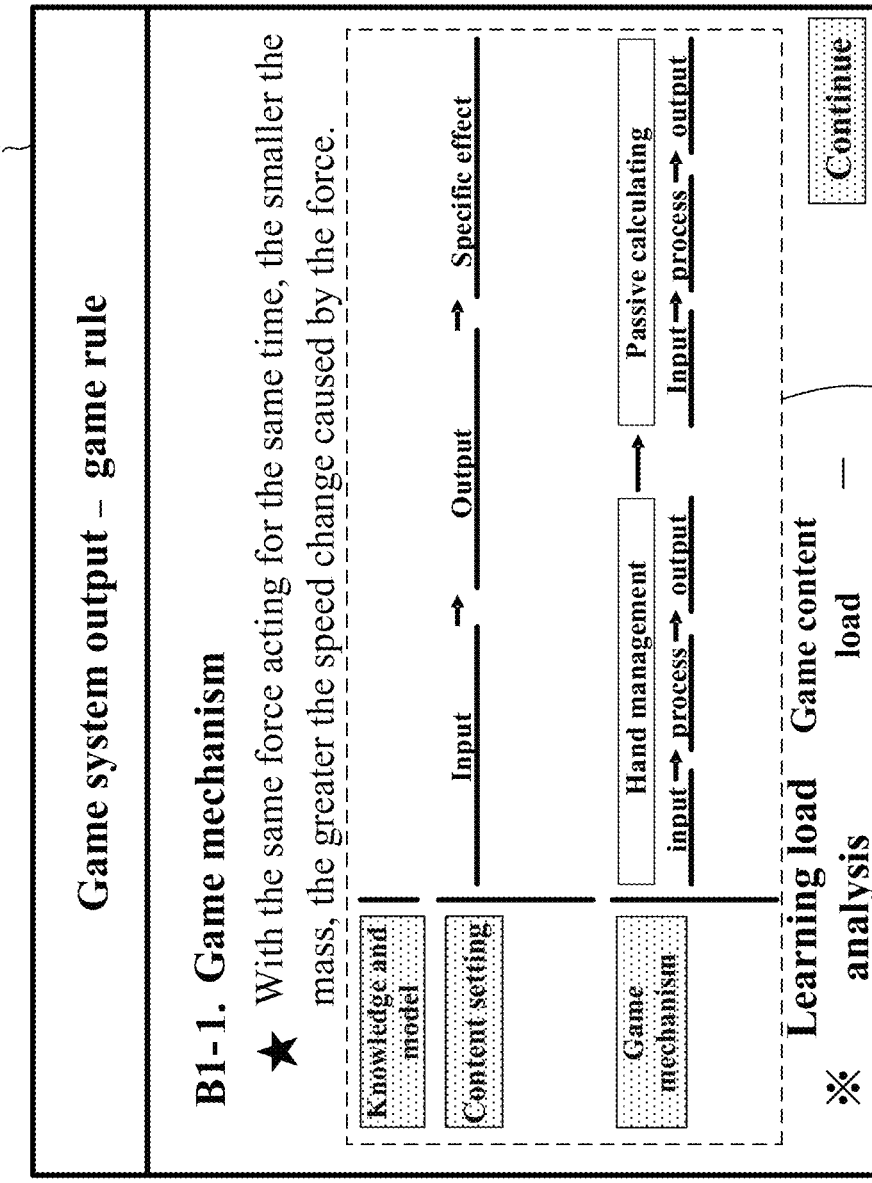

The graphical user interface 13 receives at least one selected game rule template 104a selected from the retrieved game rule templates 104. As shown in FIG. 7, FIG. 7 is a screen diagram in which the graphical user interface 13 provides the selected game rule template 104a for setting in an example of the invention.

Figure 8:
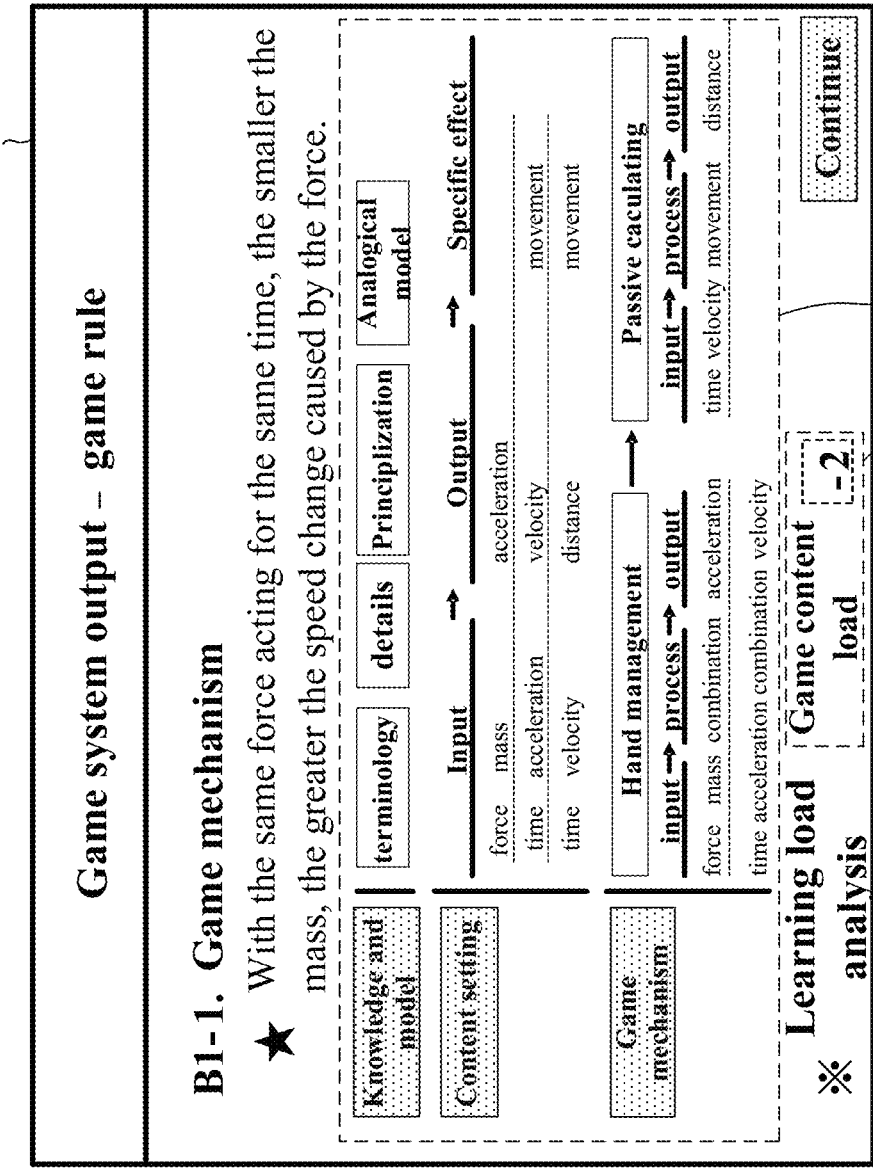
Figure 9:
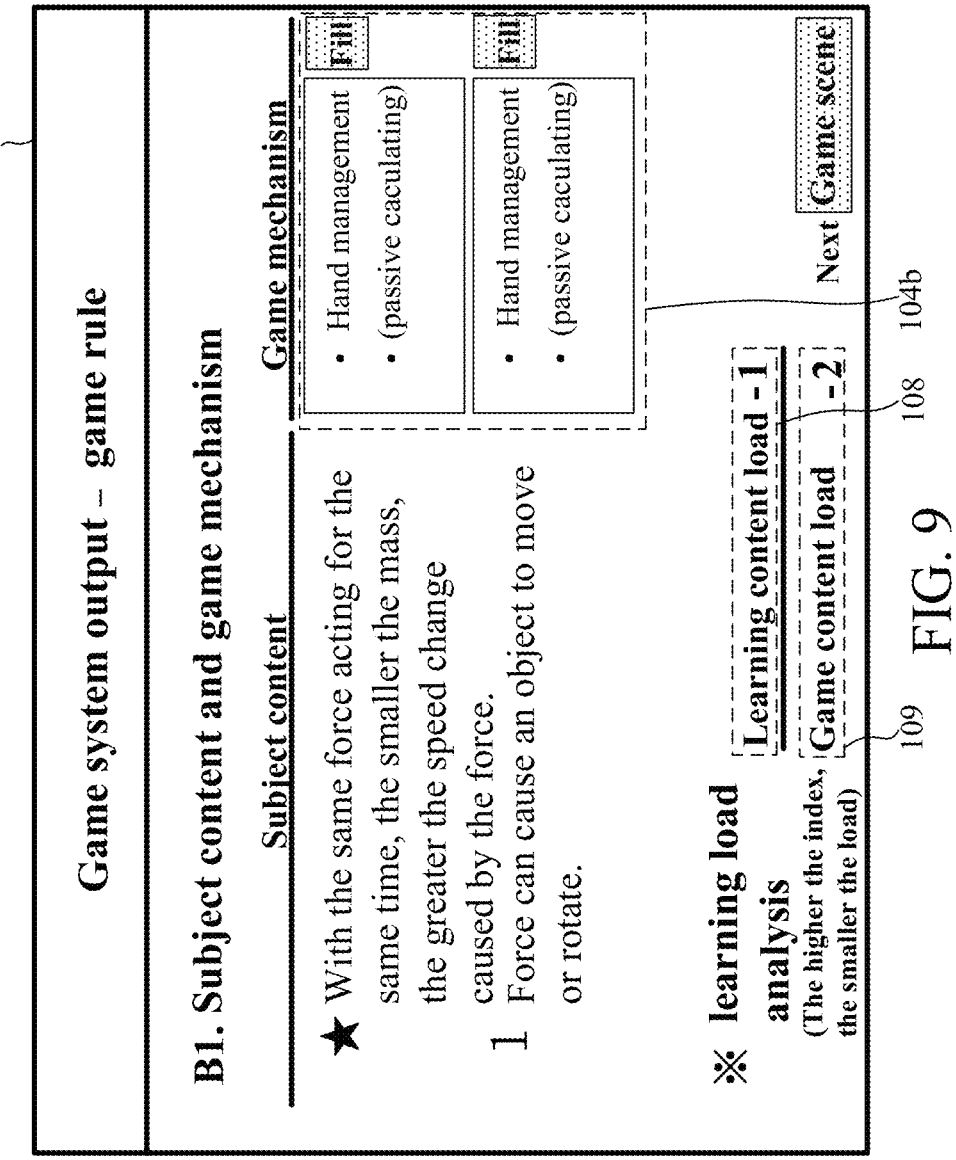

The graphical user interface 13 receives a plurality of first setting conditions for the at least one selected game rule template 104a into a set game rule 104b. As shown in FIG. 8, FIG. 8 is a screen diagram in which the graphical user interface 13 receives the plurality of first setting conditions for the at least one selected game rule template 104a in an example of the invention. As shown in FIG. 9, FIG. 9 is a screen diagram of the graphical user interface 13 showing the set game rule 104b switched from which the graphical user interface 13 receives the plurality of first setting conditions for the at least one selected game rule template 104a in the example of the invention.

The table game data processing device 11 retrieves a selected game scene template 105a from the plurality of predetermined game scene templates 105 in accordance with the set game rule 104b, and provides the selected game scene template 105a for setting through the graphical user interface 13. As shown in FIG. 10 and FIG. 11, FIG. 10 and FIG. 11 are screen diagrams in which the graphical user interface 13 provides the selected game scene template 105a for setting in an example of the invention.

Figure 12:
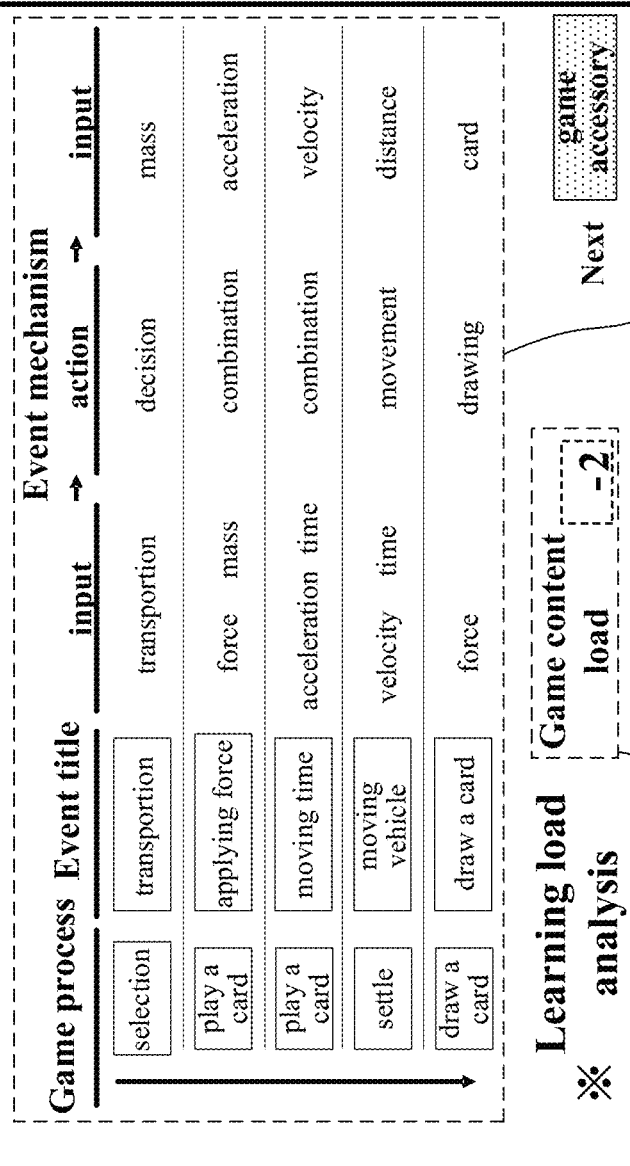

The graphical user interface 13 receives a plurality of second setting conditions for the selected game scene template 105a into a set game scene 105b. Also as shown in FIG. 10 and FIG. 11, FIG. 10 and FIG. 11 are screen diagrams in which the graphical user interface 13 receives the plurality of second setting conditions for the selected game situation template 105*a* in the example of the invention. As shown in FIG. 12, FIG. 12 is a screen diagram of the graphical user interface 13 showing the set game scene 105*b* switched from which the graphical user interface 13 receives the plurality of second setting conditions for the selected game scene template 105*a* in the example of the invention.

Figure 13:
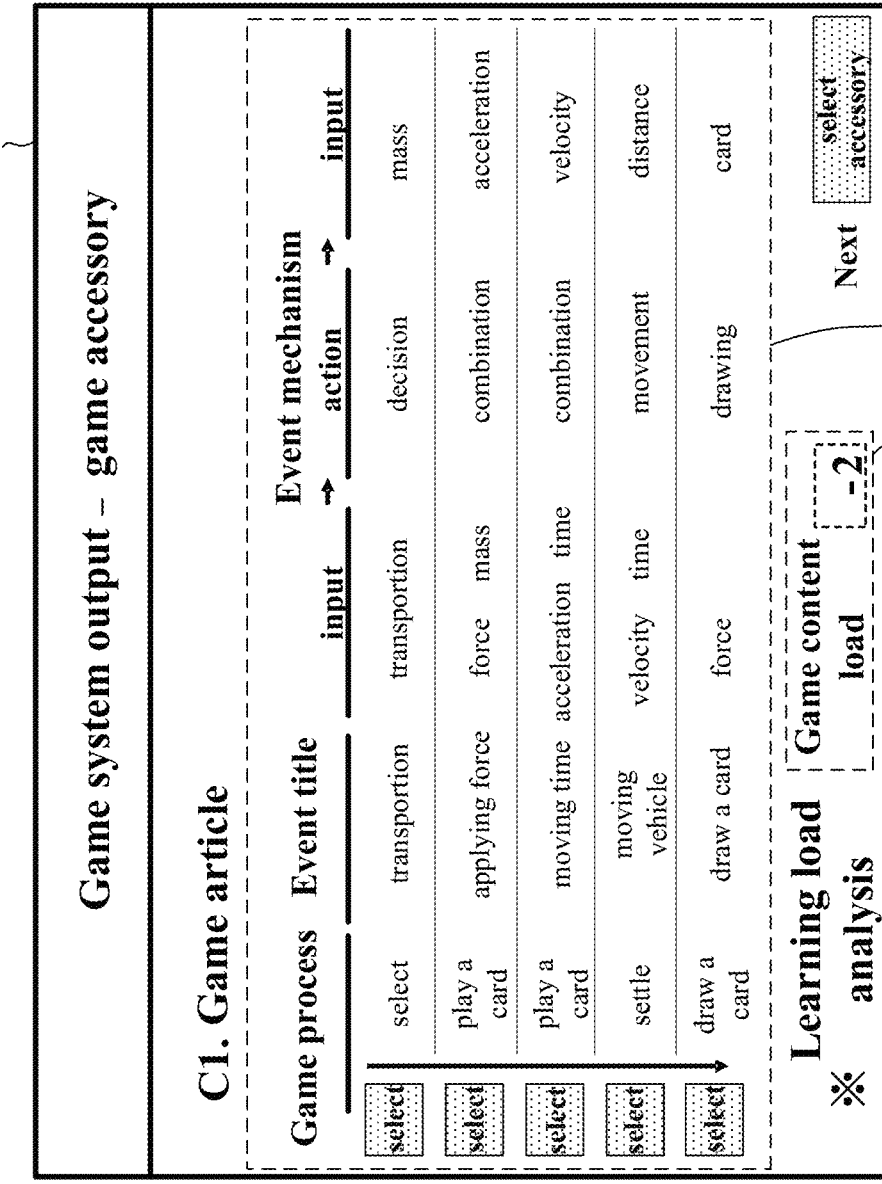

The table game data processing device 11 retrieves a plurality of retrieved game accessory templates 106*a* from the predetermined game accessory templates 106 in accordance with the set game scene 105*b*, and provides the retrieved game accessory templates 106*a* for selection through the graphical user interface 13. As shown in FIG. 13, FIG. 13 is a screen diagram in which the graphical user interface 13 provides the plurality of game accessory templates 106*a* for selection in an example of the invention.

Figure 14:
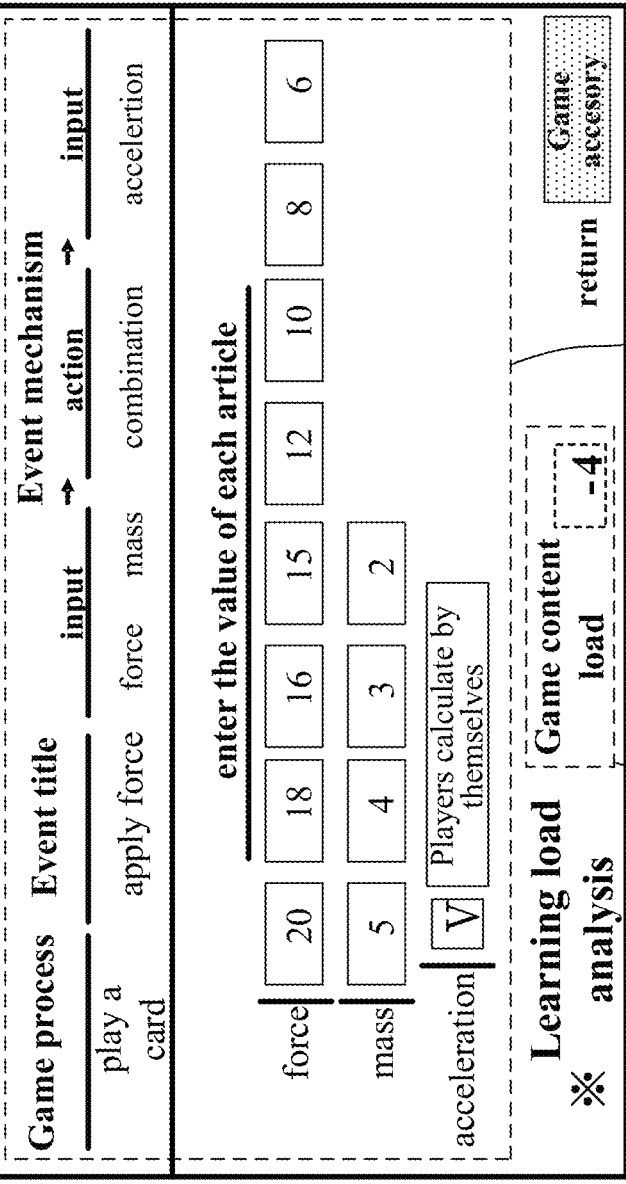
Figure 15:
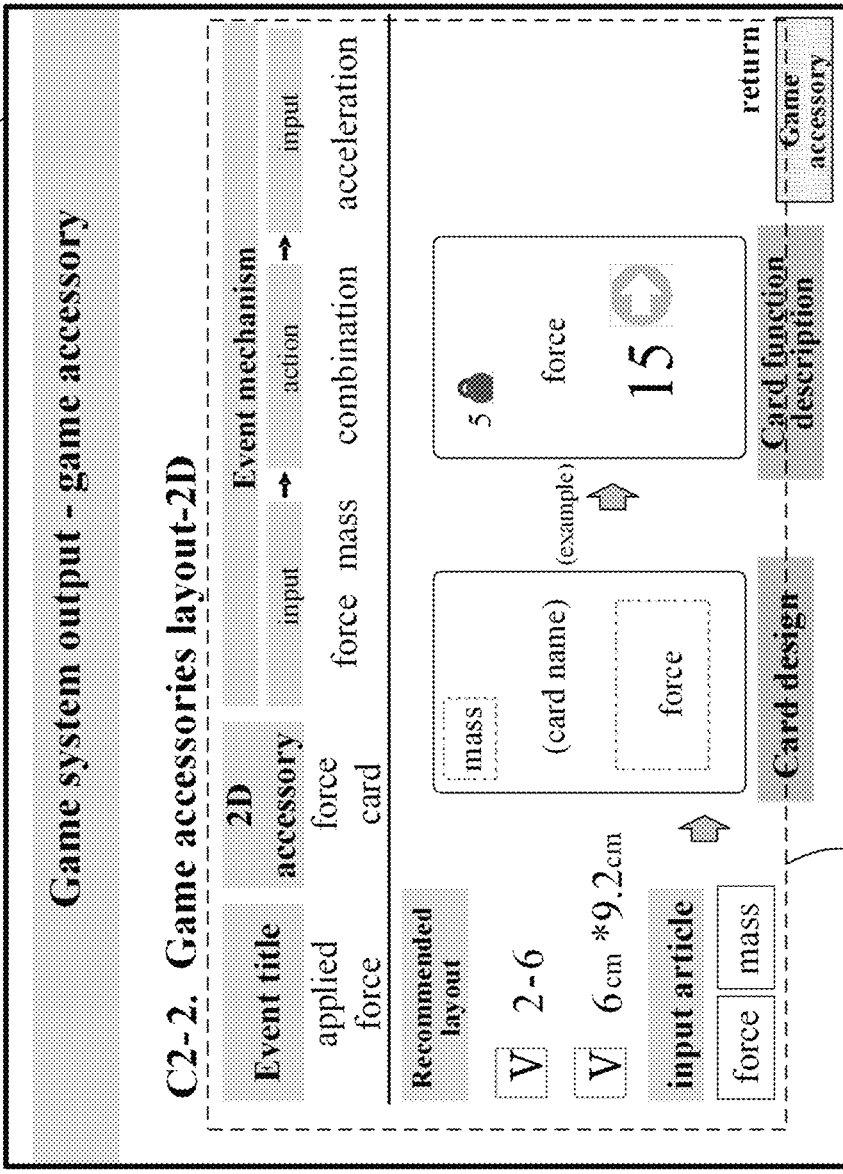

The graphical user interface 13 receives a selected game accessory template 106*b* selected from the retrieved game accessory templates 106*a*. The graphical user interface 13 receives a plurality of third setting conditions for the selected game accessory template 106*b* into a set game accessory package file 106*c*. As shown in FIG. 14 and FIG. 15, FIG. 14 and FIG. 15 are screen diagrams in which the graphical user interface 13 receives the plurality of third setting conditions for the selected game accessory template 106*b* in an example of the invention. As shown in FIG. 16, FIG. 16 is a screen diagram of the graphical user interface 13 showing the game accessory package file 106*c* switched from which the graphical user interface 13 receives the plurality of third setting conditions for the selected game accessory template 106*b*.

Figure 17:
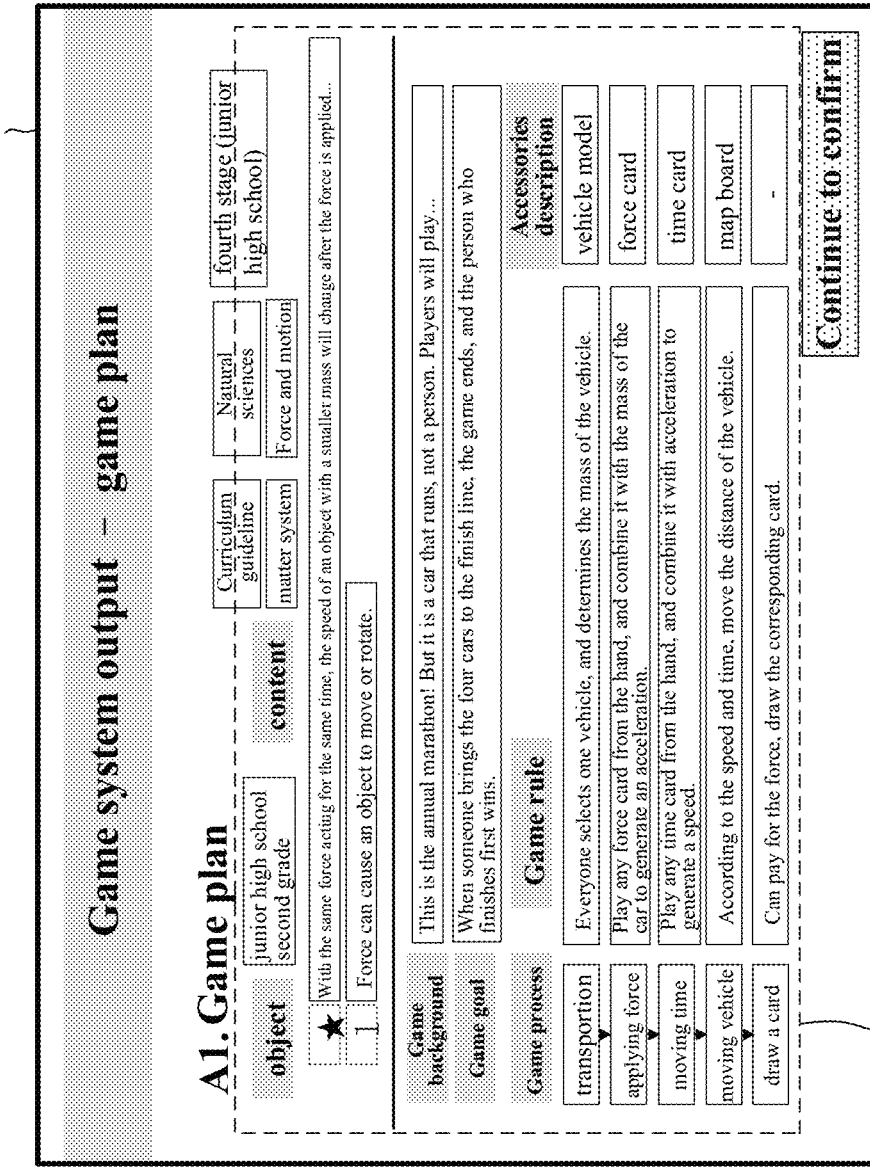
Figure 19:
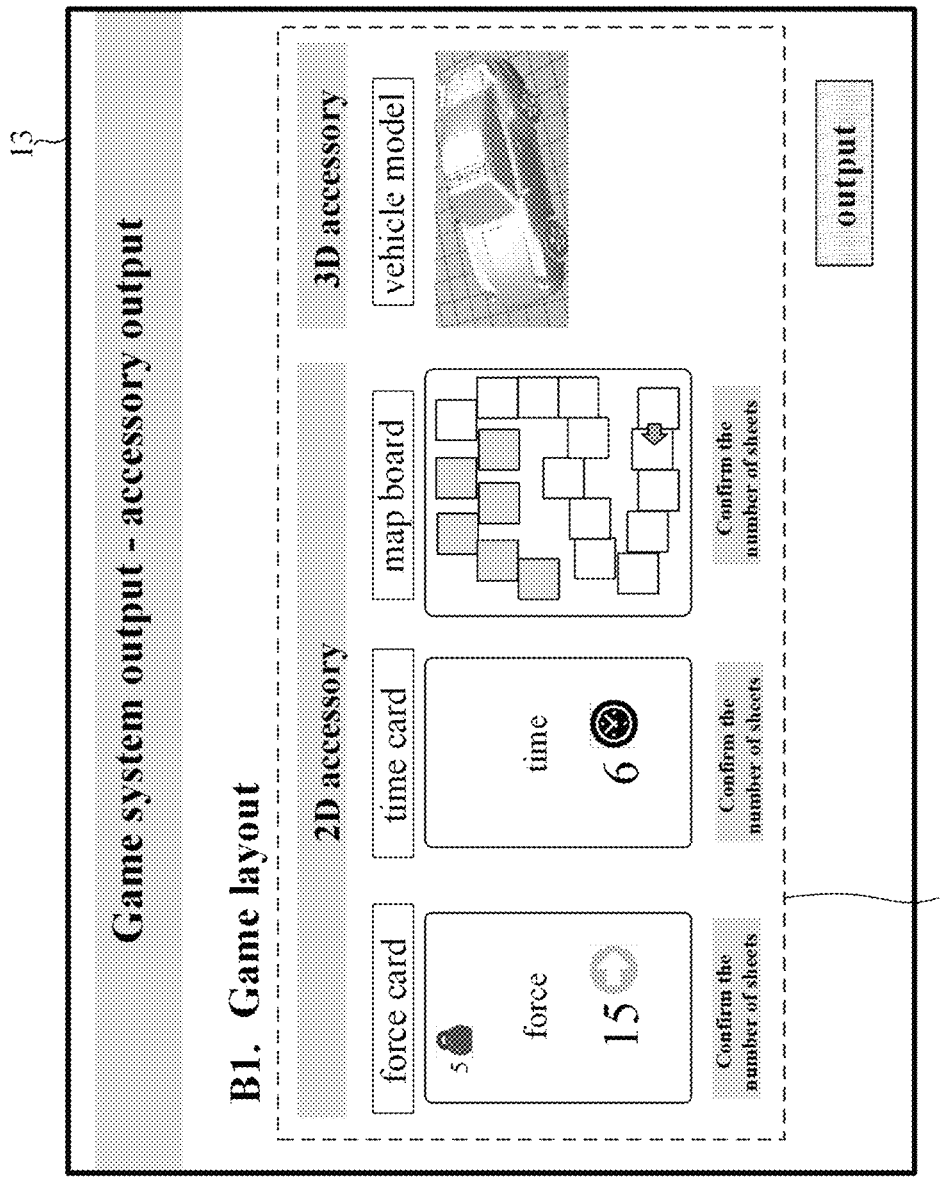

The table game data processing device 11 generates a game plan file 105*c* in accordance with the set game scene 105*b*, and outputs the game plan file 105*c* and the set game accessory package file 106*c* through the table game file outputting device 12. As shown in FIG. 17 and FIG. 18, FIG. 17 and FIG. 18 are screen diagrams of the graphical user interface 13 switching to show the game plan file 105*c* in an example of the invention. As shown in FIG. 19, FIG. 19 is a screen diagram of the graphical user interface 13 switching to show the set game accessory package file 106*c* in an example of the invention.

In one embodiment, the set game accessory package file 106*c* includes a plurality of two-dimensional accessory files and/or a plurality of three-dimensional accessory files. In the example shown in FIG. 19, the graphical user interface 13 switches to show the set game accessory package file 106 including a plurality of two-dimensional accessory files and one three-dimensional accessory file.

Further, also as shown in FIG. 2, the computer aided design system 1 according to the first preferred embodiment of the invention also includes a learning content priority analyzing device 14 and a learning load analyzing device 15. The learning content priority analyzing device 14 is coupled to the table game data processing device 11.

Figure 20:
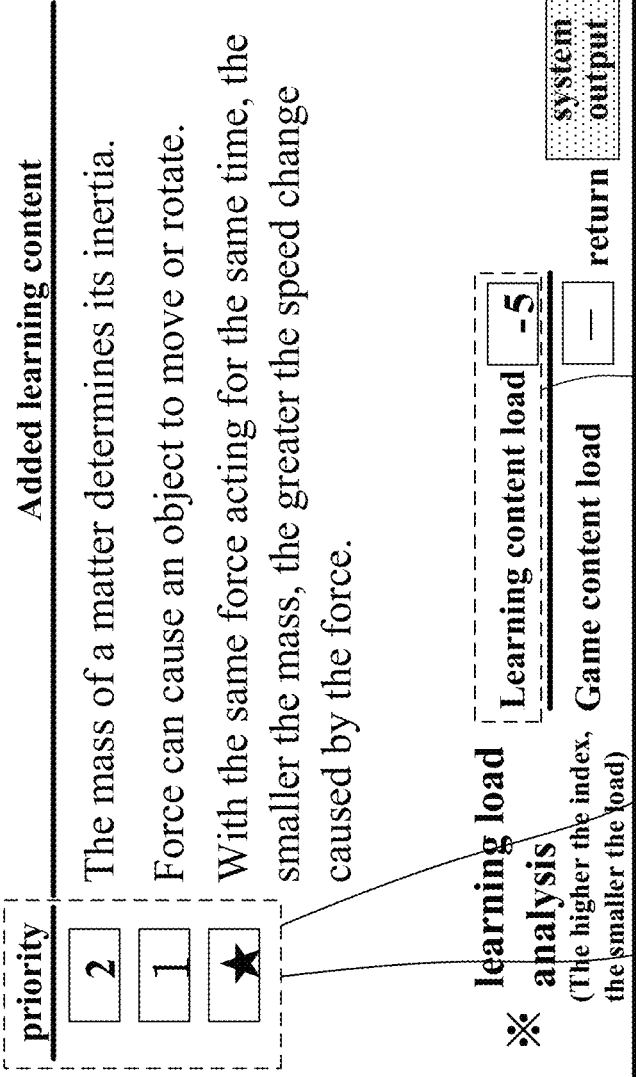

The learning content priority analyzing device 14 functions in generating a recommended learning content priority list 107 in accordance with the at least one selected learning content 103*b* and providing the recommended learning content priority list 107 for setting through the graphical user interface 13. The graphical user interface 13 receives a plurality of fourth setting conditions for the recommended learning content priority list 107 into a set learning content priority list 107*a*. As shown in FIG. 20, FIG. 20 is a screen diagram in which the graphical user interface 13 provides the recommended learning content priority list 107 for selection in an example of the present invention. Also as shown in FIG. 20, FIG. 20 also schematically shows a screen diagram in which the graphical user interface 13 receives the plurality of fourth setting conditions for the recommended learning content priority list 107 into the set learning content priority list 107*a*. In FIG. 20, "asterisk" means "compulsory", "1" means "high order", "2" means "medium order", and "3" means "low order".

The learning load analyzing device 15 is coupled to the table game data processing device 11 and the learning content priority analyzing device 14 respectively. The learning load analyzing device 15 functions in generating a learning content load value 108 in accordance with the selected object 101*a* and the set learning content priority list 107*a*. As shown in FIG. 6, FIG. 9, FIG. 20, the graphical user interface 13 also presents the learning content load value 108, at different stages of execution of the computer aided design system 1 according to the first preferred embodiment of the invention, which is provided for the user 2 to refer to when designing the educational table game. In FIG. 6, FIG. 9, and FIG. 20, the higher learning content load value 108 means the higher the learning load.

In one embodiment, the learning load analyzing device 15 also functions in generating a game content load value 109 in accordance with the set game rule 104*b*. As shown in FIGS. 8, 9, 12, 13, 14, and 16, the graphical user interface 13 also presents the game content load value 109, at different stages of execution of the computer aided design system 1 according to the first preferred embodiment of the invention, which is provided for the user 2 to refer to when designing the educational table game. In FIGS. 8, 9, 12, 13, 14, and 16, the higher the game content load value 109 means the higher the game content load.

Further, the computer aided design system 1 according to the first preferred embodiment of the invention also includes a learning effectiveness evaluating device 16. The learning effectiveness evaluating device 16 is coupled to the table game data processing device 11, the learning content priority analyzing device 14 and the learning load analyzing device 15 respectively. The learning effectiveness evaluating device 16 functions in generating a learning effectiveness evaluation value in accordance with the learning content load value 108 and the game content load value 109. In an example, the learning effectiveness evaluation value can be expressed in the form of a score. The higher the learning content load value 108 and the game content load value 109 are, the lower the learning effectiveness evaluation value will be. With the learning content load value 108, the game content load value 109, and the learning effectiveness evaluation value, the user 2 (that is, the designer of the educational table game) can be assisted in designing the educational table game based on literacy cultivation more efficiently.

Figure 21:
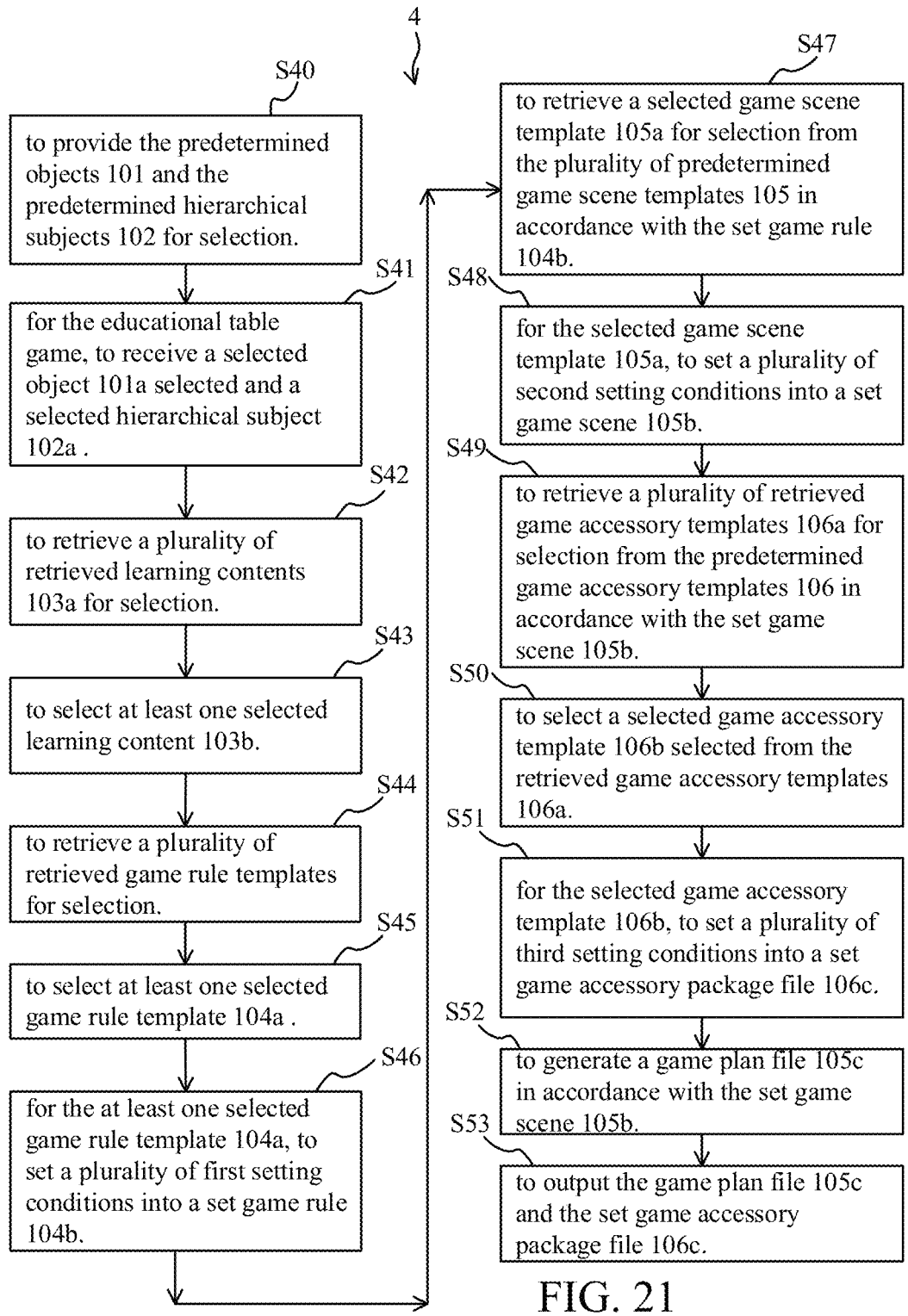
FIG. 21 is a flowchart of the computer aided design method according to the second preferred embodiment of the invention.

Referring to FIG. 21, FIG. 21 is a flowchart of a computer aided design method 4, according to the second preferred embodiment of the invention, for an educational table game. For the implementation environment of the computer aided design method 4 according to the second preferred embodiment of the invention, please refer to the implementation architecture diagram shown in FIG. 1 and refer to the functional block diagram of the computer aided design system 1 shown in FIG. 2.

The computer aided design method 4 according to the second preferred embodiment of the invention previously provides a plurality of predetermined objects 101, a plurality of predetermined hierarchical subjects 102, a plurality of predetermined learning contents 103, a plurality of predetermined game rule templates 104, a plurality of predetermined game scene templates 105, and a plurality of predetermined game accessory templates 106.

Firstly, as shown in FIG. 21, the computer aided design method 4 according to the invention performs step S40 to provide the predetermined objects 101 and the predetermined hierarchical subjects 102 for selection. Then, the computer aided design method 4 according to the invention performs step S41, for the educational table game, to receive a selected object 101a selected from the predetermined objects 101 and a selected hierarchical subject 102a selected from the predetermined hierarchical subjects 102. Next, the computer aided design method 4 according to the invention performs step S42 to retrieve a plurality of retrieved learning contents 103a for selection from the predetermined learning contents 103 in accordance with the selected hierarchical subject 102a. Afterward, the computer aided design method 4 according to the invention performs step S43 to select at least one selected learning content 103b from the retrieved learning contents 103a. Subsequently, the computer aided design method 4 according to the invention performs step 44 to retrieve a plurality of retrieved game rule templates for selection from the predetermined game rule templates 104 in accordance with the at least one selected learning content 103b. Then, the computer aided design method 4 according to the invention performs step S45 to select at least one selected game rule template 104a from the retrieved game rule templates. Next, the computer aided design method 4 according to the invention performs step S46, for the at least one selected game rule template 104a, to set a plurality of first setting conditions into a set game rule 104b. Afterward, the computer aided design method 4 according to the invention performs step S47 to retrieve a selected game scene template 105a for selection from the plurality of predetermined game scene templates 105 in accordance with the set game rule 104b. Subsequently, the computer aided design method 4 according to the invention performs step S48, for the selected game scene template 105a, to set a plurality of second setting conditions into a set game scene 105b. Then, the computer aided design method 4 according to the invention performs step S49 to retrieve a plurality of retrieved game accessory templates 106a for selection from the predetermined game accessory templates 106 in accordance with the set game scene 105b. Next, the computer aided design method 4 according to the invention performs step S50 to select a selected game accessory template 106b selected from the retrieved game accessory templates 106a. Afterward, the computer aided design method 4 according to the invention performs step S51, for the selected game accessory template 106b, to set a plurality of third setting conditions into a set game accessory package file 106c. Subsequently, the computer aided design method 4 according to the invention performs step S52 to generate a game plan file 105c in accordance with the set game scene 105b. Finally, the computer aided design method 4 according to the invention performs step S53 to output the game plan file 105c and the set game accessory package file 106c.

In one embodiment, the set game accessory package file 106c includes a plurality of two-dimensional accessory files and/or a plurality of three-dimensional accessory files.

Figure 22:
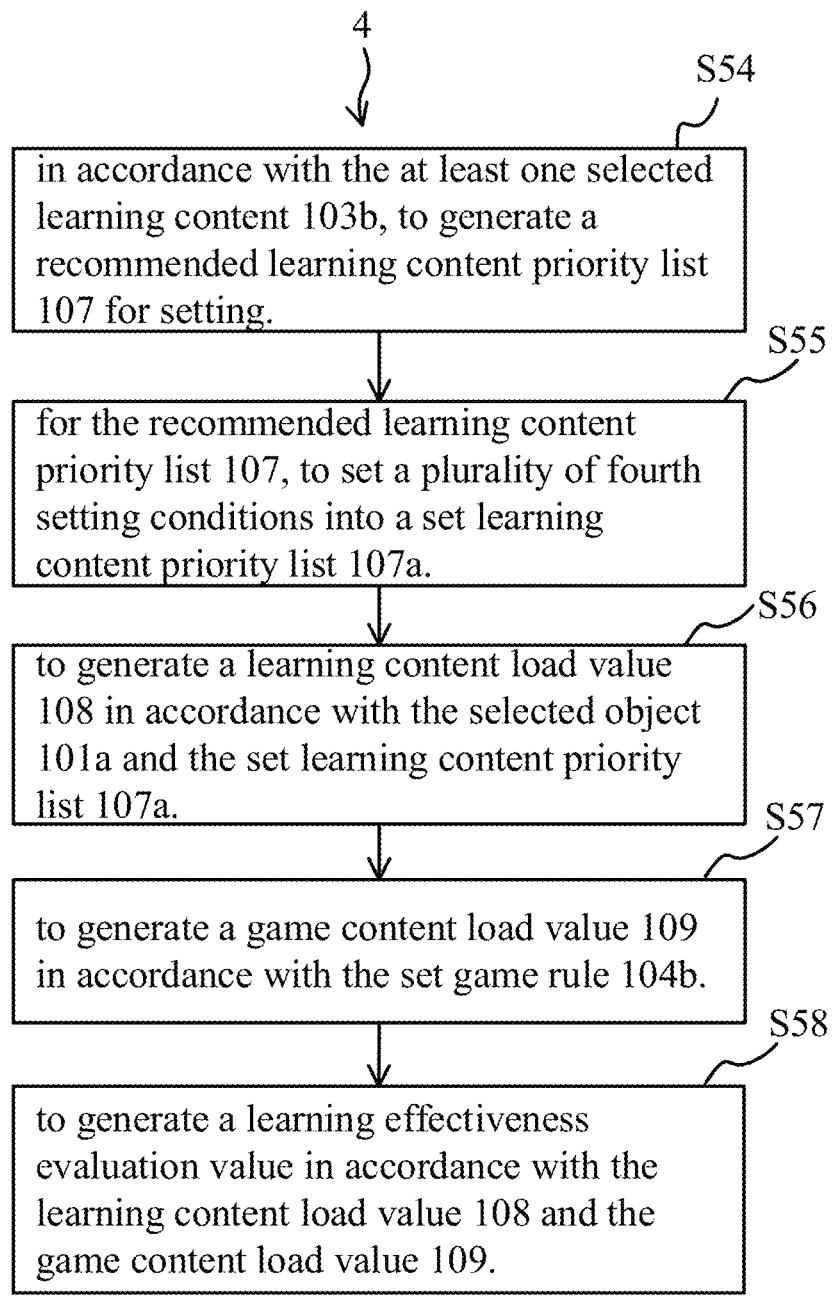
FIG. 22 is a flowchart of further steps of the computer aided design method according to the second preferred embodiment of the invention.

Referring to FIG. 22. FIG. 22 is a flowchart illustrating further steps of the computer aided design method 4 according to the second preferred embodiment of the invention.

Further, as shown in FIG. 22, the computer aided design method 4 according to the invention also performs step S54, in accordance with the at least one selected learning content 103b, to generate a recommended learning content priority list 107 for setting. Then, the computer aided design method 4 according to the invention performs step S55, for the recommended learning content priority list 107, to set a plurality of fourth setting conditions into a set learning content priority list 107a. Finally, the computer aided design method 4 according to the invention performs step S56 to generate a learning content load value 108 in accordance with the selected object 101a and the set learning content priority list 107a.

Also as shown in FIG. 22, further, the computer aided design method 4 according to the invention also performs step S57 to generate a game content load value 109 in accordance with the set game rule 104b.

Also as shown in FIG. 22, further, the computer aided design method 4 according to the invention also performs step S58 to generate a learning effectiveness evaluation value in accordance with the learning content load value 108 and the game content load value 109.

With the detailed description of the above preferred embodiments, it can be clearly understood that the computer aided design system and method according to the invention can greatly reduce the designers' workload and cost for the design of the educational table game, and allow educational table game designers to clearly understand the system of literacy and life issues and the technologies and analytical techniques when designing the educational table game. The computer aided design system and method according to the invention can allow educational table game designers to design educational table games based on literacy cultivation more efficiently.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A computer aided design system for an educational table game, comprising:
    a data storage device therein storing a plurality of predetermined objects, a plurality of predetermined hierarchical subjects, a plurality of predetermined learning contents, a plurality of predetermined game rule templates, a plurality of predetermined game scene templates, and a plurality of predetermined game accessory templates;
    a table game data processing device, coupled to the data storage device;
    a table game file outputting device, coupled to the data storage device and the table game data processing device respectively; and
    a graphical user interface, coupled to the table game data processing device, configured to provide the predetermined objects and the predetermined hierarchical subjects, retrieved by the table game data processing device, for selection, and configured to receive a selected object selected from the predetermined objects and a selected hierarchical subject selected from the predetermined hierarchical subjects for the educational table game,
    wherein the table game data processing device retrieves a plurality of retrieved learning contents from the predetermined learning contents in accordance with the selected hierarchical subject and provides the retrieved learning contents for selection through the graphical user interface, the graphical user interface receives at least one selected learning content selected from the retrieved learning contents, the table game data processing device retrieves a plurality of retrieved game rule templates from the predetermined game rule templates in accordance with the at least one selected learning content and provides the retrieved game rule templates for selection through the graphical user interface, the graphical user interface receives at least one selected game rule template selected from the retrieved game rule templates, the graphical user interface receives a plurality of first setting conditions for the at least one selected game rule template into a set game rule, the table game data processing device retrieves a selected game scene template from the plurality of predetermined game scene templates in accordance with the set game rule and provides the selected game scene template for setting through the graphical user interface, the graphical user interface receives a plurality of second setting conditions for the selected game scene template into a set game scene, the table game data processing device retrieves a plurality of retrieved game accessory templates from the predetermined game accessory templates in accordance with the set game scene and provides the retrieved game accessory templates for selection through the graphical user interface, the graphical user interface receives a selected game accessory template selected from the retrieved game accessory templates, the graphical user interface receives a plurality of third setting conditions for the selected game accessory template into a set game accessory package file, the table game data processing device generates a game plan file in accordance with the set game scene and outputs the game plan file and the set game accessory package file through the table game file outputting device.

2. The computer aided design system of claim 1, further comprising:

a learning content priority analyzing device, being coupled to the table game data processing device, and being for generating a recommended learning content priority list in accordance with the at least one selected learning content and providing the recommended learning content priority list for setting through the graphical user interface, wherein the graphical user interface receives a plurality of fourth setting conditions for the recommended learning content priority list into a set learning content priority list; and a learning load analyzing device, being coupled to the table game data processing device and the learning content priority analyzing device respectively, and being for generating a learning content load value in accordance with the selected object and the set learning content priority list.

3. The computer aided design system of claim 2, wherein the learning load analyzing device is also for generating a game content load value in accordance with the set game rule.

4. The computer aided design system of claim 3, further comprising:

a learning effectiveness evaluating device, being coupled to the table game data processing device, the learning content priority analyzing device and the learning load analyzing device respectively, and being for generating a learning effectiveness evaluation value in accordance with the learning content load value and the game content load value.

5. The computer aided design system of claim 4, wherein the set game accessory package file comprises a plurality of two-dimensional accessory files and/or a plurality of three-dimensional accessory files.

\* \* \* \* \*